United States Patent
Wang

(10) Patent No.: US 12,506,588 B2
(45) Date of Patent: Dec. 23, 2025

(54) GLITCH DETECTOR CAPABLE OF DETECTING UNDER VOLTAGE GLITCH AND OVER VOLTAGE GLITCH

(71) Applicant: MEDIATEK INC., Hsin-Chu (TW)

(72) Inventor: Jhen-Kai Wang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 769 days.

(21) Appl. No.: 17/866,550

(22) Filed: Jul. 18, 2022

(65) Prior Publication Data

US 2023/0078724 A1 Mar. 16, 2023

Related U.S. Application Data

(60) Provisional application No. 63/243,240, filed on Sep. 13, 2021.

(51) Int. Cl.
*H04L 9/00* (2022.01)
*G06F 21/55* (2013.01)

(52) U.S. Cl.
CPC .......... *H04L 9/004* (2013.01); *G06F 21/554* (2013.01)

(58) Field of Classification Search
CPC ...... G06F 21/554; G06F 21/556; G06F 21/81; G09C 1/00; H04L 9/004; H04L 9/3226
USPC .......................................................... 361/86
See application file for complete search history.

(56) References Cited

U.S. PATENT DOCUMENTS

| | | | |
|---|---|---|---|
| 7,085,979 B2 | 8/2006 | Kim et al. | |
| 7,782,220 B2 | 8/2010 | Nakamura et al. | |
| 2021/0048455 A1 | 2/2021 | Xue | |

FOREIGN PATENT DOCUMENTS

| | | | |
|---|---|---|---|
| CN | 104166053 A | 11/2014 | |
| CN | 110462410 A | 11/2019 | |
| CN | 110462415 A | * 11/2019 | ....... G01R 19/16519 |
| CN | 111722020 | 9/2020 | |

OTHER PUBLICATIONS

Machine translation of Xue et al. Chinese Patent Document CN 110462415 A Jun. 2019 (Year: 2019).*

* cited by examiner

*Primary Examiner* — Kevin J Comber
(74) *Attorney, Agent, or Firm* — Winston Hsu

(57) ABSTRACT

The present invention provides a glitch detector including a first inverter, second inverter, a charge sharing component and a warning flag generator. The first inverter is configured to receive a first signal at a first node to generate a second signal to a second node. The second inverter is configured to receive the second signal at the second node to generate the first signal to the first node. The charge sharing component is configured to selectively connect the first node to the second node. The warning flag generator is coupled to the first node or the second node, and configured to determine whether a supply voltage of the glitch detector suffers an under voltage glitch according to a voltage level of the first signal or a voltage level of the second signal, to determine whether to output a warning flag.

14 Claims, 5 Drawing Sheets

GLITCH DETECTOR CAPABLE OF DETECTING UNDER VOLTAGE GLITCH AND OVER VOLTAGE GLITCH

CROSS REFERENCE TO RELATED APPLICATIONS

This application claims the benefit of U.S. Provisional Application No. 63/243,240, filed on Sep. 13, 2021. The content of the application is incorporated herein by reference.

BACKGROUND

Electromagnetic fault injection (EMFI) is a well-known technique used to attack a power of a chip for weakening its security, therefore, a power detector or a glitch detector is designed in the chip for detecting power attacking. The conventional glitch detector may be a comparator-based glitch detector or a RC-trigger type detector. However, the comparator-based glitch detector has more power consumption, and the RC-trigger type detector has passive devices that require larger chip area, so these glitch detectors are not suitable for being placed in the chip.

SUMMARY

It is therefore an objective of the present invention to provide a glitch detector, which has smaller chip area and can effectively detect an under voltage glitch attack and/or an over voltage glitch attack, to solve the above-mentioned problems.

According to one embodiment of the present invention, a glitch detector comprising a first inverter, second inverter, a charge sharing component and a warning flag generator is disclosed. The first inverter is configured to receive a first signal at a first node to generate a second signal to a second node. The second inverter is configured to receive the second signal at the second node to generate the first signal to the first node. The charge sharing component is coupled between the first node and the second node, and is configured to selectively connect the first node to the second node. The warning flag generator is coupled to the first node or the second node, and configured to determine whether a supply voltage of the glitch detector suffers an under voltage glitch according to a voltage level of the first signal or a voltage level of the second signal, to determine whether to output a warning flag.

According to one embodiment of the present invention, a glitch detector comprising a first inverter, second inverter, a bleeding path and a warning flag generator is disclosed. The first inverter is configured to receive a first signal at a first node to generate a second signal to a second node. The second inverter is configured to receive the second signal at the second node to generate the first signal to the first node. The bleeding path is configured to selectively provide a current path between the second node and a reference voltage. The warning flag generator is coupled to the first node or the second node, and configured to determine whether a supply voltage of the glitch detector suffers an under voltage glitch according to a voltage level of the first signal or a voltage level of the second signal, to determine whether to output a warning flag.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
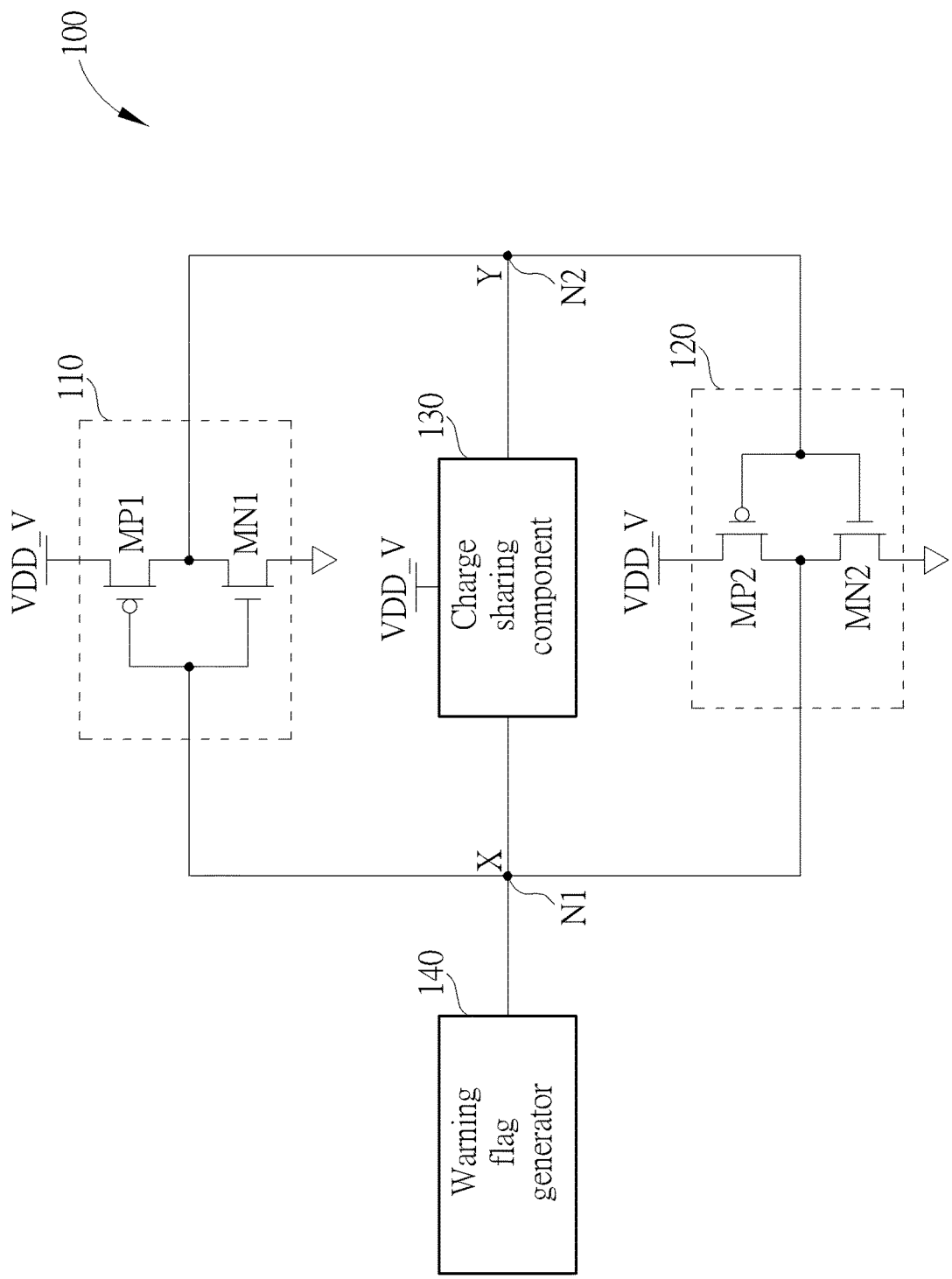
FIG. 1 is a diagram illustrating a glitch detector according to one embodiment of the present invention.

FIG. 1 is a diagram illustrating a glitch detector 100 according to one embodiment of the present invention. As shown in FIG. 1, the glitch detector 100 comprises two logical circuits connected in a latch type, wherein the two logical circuits are inverters 110 and 120 in this embodiment. The inverter 110 comprises a P-type transistor MP1 and an N-type transistor MN1 connected between a supply voltage VDD_V and a ground voltage, and the inverter 110 is configured to receive a signal X at a node N1 to generate a signal Y at a node N2. The inverter 120 comprises a P-type transistor MP2 and an N-type transistor MN2 connected between the supply voltage VDD_V and the ground voltage, and the inverter 120 is configured to receive the signal Y at the node N2 to generate the signal X at the node N1. The glitch detector 100 further comprises a charge sharing component 130 and a warning flag generator 140, wherein the charge sharing component 130 is connected between the node N1 and the node N2, and the warning flag generator 140 is connected to the node N1.

In this embodiment, the inverter 110 is easy to pull down a voltage level of the signal Y of the node N2, but it is difficult to pull up the voltage level of the signal Y of the node N2. In order for the inverter 110 to have the above characteristics, a size of the N-type transistor MN1 may be greater than a size of the P-type transistor MP1, more N-type transistors are connected in parallel to serve as the N-type transistor MN1, more P-type transistors are connected in series to serve as the P-type transistor MP1, or the P-type transistor MP1 and the N-type transistor MN1 are implemented by devices with different threshold voltage. In addition, the inverter 120 is easy to pull up a voltage level of the signal X of the node N1, but it is difficult to pull down the voltage level of the signal X of the node N1. In order for the inverter 120 to have the above characteristics, a size of the P-type transistor MP2 may be greater than a size of the N-type transistor MN2, more P-type transistors are connected in parallel to serve as the P-type transistor MP2, more N-type transistors are connected in series to serve as the N-type transistor MN2, or the P-type transistor MP2 and the N-type transistor MN2 are implemented by devices with different threshold voltages.

In addition, the charge sharing component 130 can be implemented by using a switch to selectively connect the node N1 and the node N2. For example, the charge sharing component 130 can be a P-type transistor controlled by the supply voltage VDD_V.

Figure 2:
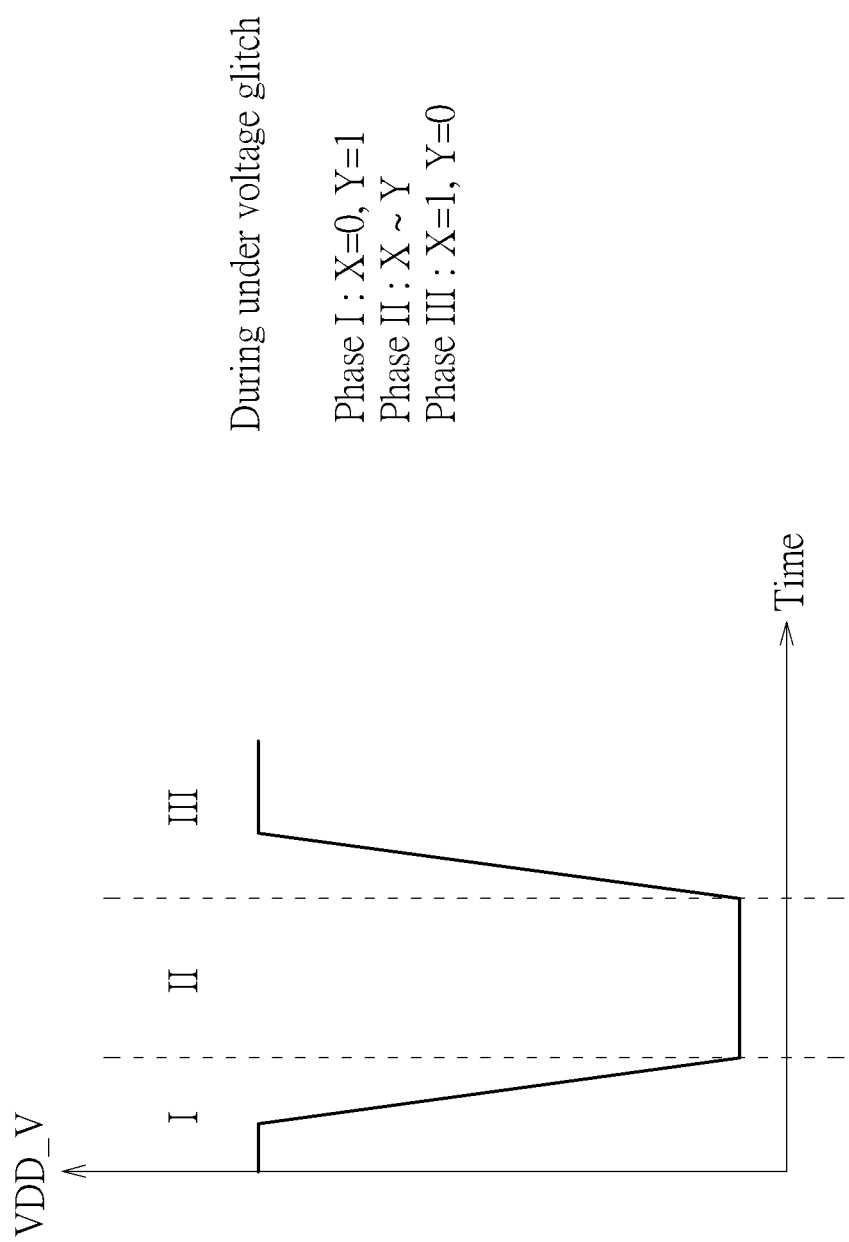
FIG. 2 shows the operations of the glitch detector shown in FIG. 1 when a supply voltage suffers an under voltage glitch according to one embodiment of the present invention.

The glitch detector 100 shown in FIG. 1 is used to detect an under voltage glitch of the supply voltage VDD_V. In the operation of the glitch detector 100, referring to FIG. 1 and FIG. 2 together, in a first phase, the signal X is controlled to have a low voltage level (i.e., logical value "0") while the signal Y is controlled to have a high voltage level (i.e., logical value "1"), and the charge sharing component 130 is disabled so that the node N1 is electrically disconnected from the node N2.

In a second phase following the first phase, because the supply voltage VDD_V suffers the under voltage glitch, the charge sharing component 130 is enabled so that the node N1 is electrically connected to the node N2, and the voltage level of the signal X is closer to the voltage level of the signal Y.

In a third phase following the second phase, because the inverter 110 is easy to pull down the voltage level of the signal Y of the node N2, the inverter 120 is easy to pull up the voltage level of the signal X of the node N1, and the inverters 110 and 120 form a positive feedback loop, the signal X will be pulled high while the signal Y will be pulled down when the supply voltage VDD_V returns to the original voltage level. That is, after the under voltage glitch disappears, the signal X is equal to the logical value "1", and the signal Y is equal to the logical value "0".

Then, after the signal X becomes the logical value "1", the warning flag generator 140 is triggered to output a warning signal to a processing circuit to notify that the supply voltage VDD_V suffers the under voltage glitch. After the warning flag generator 140 outputs the warning signal, a reset circuit (not shown) will force the node N1 and the node N2 to be "0" and "1", respectively.

In another embodiment, the warning flag generator 140 can be connected to the node N2, and after the signal Y becomes the logical value "0", the warning flag generator 140 is triggered to output the warning signal. This alternative design shall fall within the scope of the present invention.

In light of above, the glitch detector 100 can effectively detect the under voltage glitch. In addition, because the glitch detector 100 does not include any passive element, the glitch detector 100 has smaller chip area and is easy to be positioned within the processor.

Figure 3:
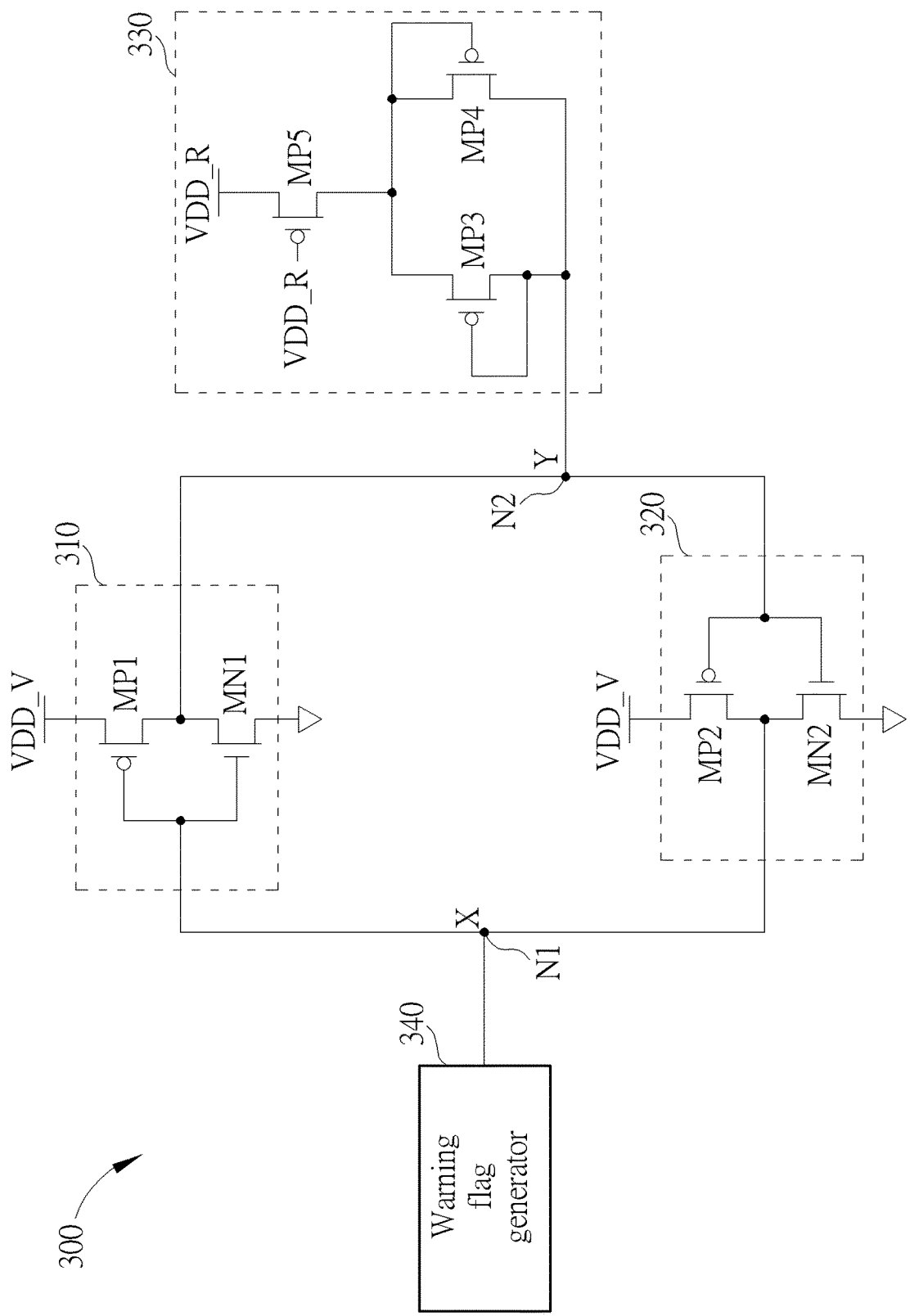
FIG. 3 is a diagram illustrating a glitch detector according to one embodiment of the present invention.

FIG. 3 is a diagram illustrating a glitch detector 300 according to one embodiment of the present invention. As shown in FIG. 3, the glitch detector 300 comprises two logical circuits connected in a latch type, wherein the two logical circuits are inverters 310 and 320 in this embodiment. The inverter 310 comprises a P-type transistor MP1 and an N-type transistor MN1 connected between a supply voltage VDD_V and a ground voltage, and the inverter 310 is configured to receive a signal X at a node N1 to generate a signal Y at a node N2. The inverter 320 comprises a P-type transistor MP2 and an N-type transistor MN2 connected between the supply voltage VDD_V and the ground voltage, and the inverter 320 is configured to receive the signal Y at the node N2 to generate the signal X at the node N1. The glitch detector 300 further comprises a bleeding path 330 and a warning flag generator 340, wherein the bleeding path 330 is connected between the node N2 and a reference voltage VDD_R, and the warning flag generator 340 is connected to the node N1.

In this embodiment, the inverter 110 is easy to pull down a voltage level of the signal Y of the node N2, but it is difficult to pull up the voltage level of the signal Y of the node N2. In order for the inverter 110 to have the above characteristics, a size of the N-type transistor MN1 may be greater than a size of the P-type transistor MP1, more N-type transistors are connected in parallel to serve as the N-type transistor MN1, more P-type transistors are connected in series to serve as the P-type transistor MP1, or the P-type transistor MP1 and the N-type transistor MN1 are implemented by devices with different threshold voltage. In addition, the inverter 120 is easy to pull up a voltage level of the signal X of the node N1, but it is difficult to pull down the voltage level of the signal X of the node N1. In order for the inverter 120 to have the above characteristics, a size of the P-type transistor MP2 may be greater than a size of the N-type transistor MN2, more P-type transistors are connected in parallel to serve as the P-type transistor MP2, more N-type transistors are connected in series to serve as the N-type transistor MN2, or the P-type transistor MP2 and the N-type transistor MN2 are implemented by devices with different threshold voltages.

The bleeding path 330 is configured to selectively provide a current path between the node N2 and the reference voltage VDD_R, especially the bleeding path 330 is disabled (i.e. not provide the current path) when the signal Y is at the normal voltage level (i.e., close to the supply voltage VDD_V), and the bleeding path 330 is enabled when the signal Y is greater than a predetermined voltage. In this embodiment, not a limitation of the present invention, the bleeding path 330 comprises P-type transistors MP3-MP5, wherein the P-type transistors MP3 and MP4 are diode-connected and coupled between the node N2 and the P-type transistor MP5, and the P-type transistor MP5 is controlled by the reference voltage VDD_R. In this embodiment, the reference voltage VDD_R has a high voltage level such as the supply voltage VDD_V, and the reference voltage VDD_R is different from the supply voltage VDD_V.

In one embodiment, a bulk of each of the P-type transistors MP3 and MP4 is connected to the reference voltage VDD_R to form a drain-to-bulk body diode to provide additional current paths.

Figure 4:
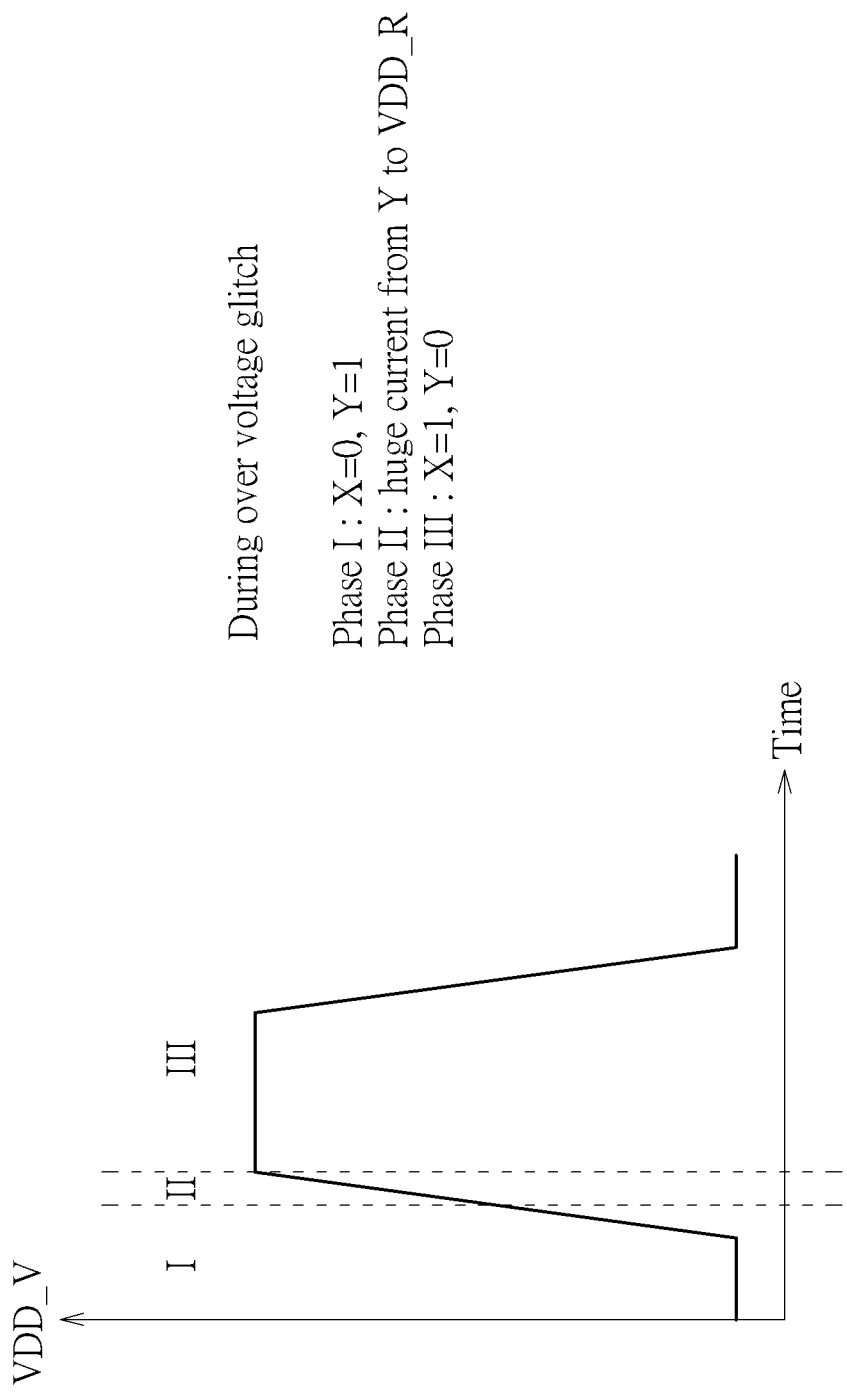
FIG. 4 shows the operations of the glitch detector shown in FIG. 3 when a supply voltage suffers an over voltage glitch according to one embodiment of the present invention.

The glitch detector 300 shown in FIG. 3 is used to detect an over voltage glitch of the supply voltage VDD_V. In the operation of the glitch detector 300, referring to FIG. 3 and FIG. 4 together, in a first phase, the signal X is controlled to have a low voltage level (i.e., logical value "0") while the signal Y is controlled to have a high voltage level (i.e., logical value "1"). At this time, the bleeding path 330 does not provide a current path between the node N2 and the reference voltage VDD_R because the P-type transistor MP5 is disabled.

In a second phase following the first phase, because the supply voltage VDD_V suffers the over voltage glitch, the supply voltage VDD_V rapidly charges the node N2 via the P-type transistor MP1 of the inverter 110, so that the voltage level of the signal Y starts to increase. In addition, when the voltage level of the signal Y is greater than a predetermined voltage, the P-type transistors MP4 and MP5 are enabled to provide current path, and a huge current is flowing from the node N2 to the reference voltage VDD_R to prevent the voltage level of the signal Y from continuing to rise. At this time, when the voltage level of the signal Y is greater than the predetermined voltage, the P-type transistor MP2 is enabled so that the supply voltage VDD_V starts to charge the node N1, and the voltage level of the signal X starts to rise.

In a third phase following the second phase, after the over voltage glitch is steady, because the bleeding path 330 provides the huge bleeding current, the inverter 310 is easy to pull down the voltage level of the signal Y of the node N2, the inverter 320 is easy to pull up the voltage level of the signal X of the node N1, and the inverters 310 and 320 form a positive feedback loop, the signal X will be pulled high while the signal Y will be pulled down. That is, after the over voltage glitch disappears, the signal X is equal to the logical value "1", and the signal Y is equal to the logical value "0".

Then, after the signal X becomes the logical value "1", the warning flag generator 340 is triggered to output a warning signal to a processing circuit to notify that the supply voltage VDD_V suffers the over voltage glitch. After the warning flag generator 340 outputs the warning signal, a reset circuit (not shown) will force the node N1 and the node N2 to be "0" and "1", respectively.

In this embodiment, the P-type transistor MP5 can serve as part of the reset circuit to make the signal Y to be "1", that is the gate electrode of P-type transistor MP5 can be controlled by using a reset signal with low voltage level, and the P-type transistor MP3 works with the P-type transistor MP5 to pull high the signal Y to reset the glitch detector 300.

In another embodiment, the warning flag generator 340 can be connected to the node N2, and after the signal Y becomes the logical value "0", the warning flag generator 340 is triggered to output the warning signal. This alternative design shall fall within the scope of the present invention.

In light of above, the glitch detector 300 can effectively detect the over voltage glitch. In addition, because the glitch detector 300 does not include any passive element, the glitch detector 300 has smaller chip area and is easy to be positioned within the processor.

Figure 5:
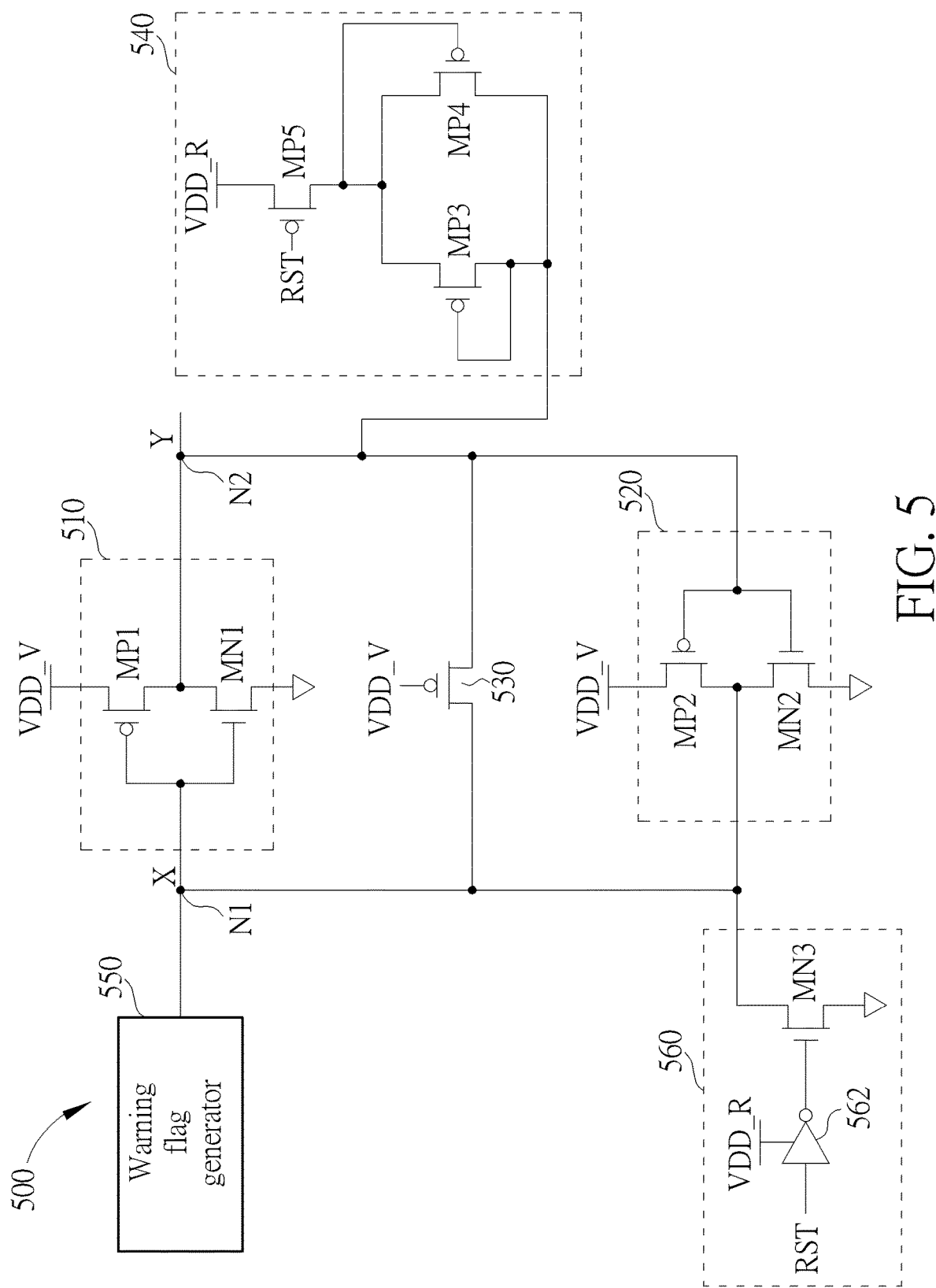
FIG. 5 is a diagram illustrating a glitch detector for detecting under voltage glitch and over voltage glitch according to one embodiment of the present invention.

In an alternative embodiment, the glitch detector 100 shown in FIG. 1 and the glitch detector 300 shown in FIG. 3 can be combined so that the glitch detector can detect the under voltage glitch and the over voltage glitch. That is, the glitch detector 100 can be modified to add the bleeding path 330, or the glitch detector 300 can be modified to add the charge sharing component 130. FIG. 5 is a diagram illustrating a glitch detector 500 according to one embodiment of the present invention. As shown in FIG. 5, the glitch detector 500 comprises two logical circuits connected in a latch type, wherein the two logical circuits are inverters 510 and 520 in this embodiment. The inverter 510 comprises a P-type transistor MP1 and an N-type transistor MN1 connected between a supply voltage VDD_V and a ground voltage, and the inverter 510 is configured to receive a signal X at a node N1 to generate a signal Y at a node N2. The inverter 520 comprises a P-type transistor MP2 and an N-type transistor MN2 connected between the supply voltage VDD_V and the ground voltage, and the inverter 520 is configured to receive the signal Y at the node N2 to generate the signal X at the node N1. The glitch detector 500 further comprises a charge sharing component 530, a bleeding path 540, a warning flag generator 550 and a reset circuit 560, wherein the charge sharing component 530 is connected between the node N1 and the node N2, the bleeding path 540 is connected between the node N2 and a reference voltage VDD_R, the warning flag generator 550 is connected to the node N1, and the reset circuit 560 is coupled to the node N1.

In this embodiment, the inverter 510 is easy to pull down a voltage level of the signal Y of the node N2, but it is difficult to pull up the voltage level of the signal Y of the node N2; and the inverter 520 is easy to pull up a voltage level of the signal X of the node N1, but it is difficult to pull down the voltage level of the signal X of the node N1. The charge sharing component 530 can be implemented by using a P-type transistor controlled by the supply voltage VDD_V. The bleeding path 540 is configured to selectively provide a current path between the node N2 and the reference voltage VDD_R, especially the bleeding path 540 is disabled (i.e. not provide the current path) when the signal Y is at the normal voltage level (i.e., close to the supply voltage VDD_V), and the bleeding path 540 is enabled when the signal Y is greater than a predetermined voltage. In this embodiment, not a limitation of the present invention, the bleeding path 540 comprises P-type transistors MP3-MP5, wherein the P-type transistor MP5 is controlled by a reset signal RST. It is noted that operations of the charge sharing component 530 and the bleeding path 540 are the same as the charge sharing component 130 and the bleeding path 330 shown in FIG. 1 and FIG. 3, respectively, so the details of these components are omitted here.

The reset circuit 560 comprises an inverter 562 and an N-type transistor MN3. In this embodiment, after the warning flag generator 550 outputs a warning signal, the reset signal RST with low voltage signal is inputted into the inverter 562 to enable the N-type transistor MN3 to discharge the node N1, to make the signal X be the logical value "0" again.

In this embodiment, the P-type transistor MP5 can serve as part of the reset circuit to make the signal Y to be "1", that is the gate electrode of P-type transistor MP5 can be controlled by using the reset signal RST, and the P-type transistor MP3 works with the P-type transistor MP5 to pull high the signal Y to reset the glitch detector 500. In addition, the reset signal RST may have the high voltage level when the glitch detector 500 is not required to be reset.

Briefly summarized, in the glitch detector of the present invention, by designing the charge sharing component, the glitch detector can effectively detect the under voltage glitch; and by designing the bleeding path, the glitch detector can effectively detect the over voltage glitch. In addition, because the glitch detector can be implemented without using any passive element, the glitch detector has smaller chip area and is easy to be positioned within the processor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A glitch detector, comprising:
   a first inverter, configured to receive a first signal at a first node to generate a second signal to a second node;
   a second inverter, configured to receive the second signal at the second node to generate the first signal to the first node;

a charge sharing component, coupled between the first node and the second node, configured to selectively connect the first node to the second node; and
a warning flag generator, coupled to the first node or the second node, configured to determine whether a supply voltage of the glitch detector suffers an under voltage glitch according to a voltage level of the first signal or a voltage level of the second signal, to determine whether to output a warning flag;
wherein the first inverter comprises a first P-type transistor and a first N-type transistor, a size of the first N-type transistor is greater than a size of the first P-type transistor, or the first P-type transistor and the first N-type transistor are implemented with different threshold voltages; and the second inverter comprises a second P-type transistor and a second N-type transistor, a size of the second P-type transistor is greater than a size of the second N-type transistor, or the second P-type transistor and the second N-type transistor are implemented with different threshold voltages.

2. The glitch detector of claim 1, wherein the first inverter and the second inverter are powered by the supply voltage, and the charge sharing component is enabled when the supply voltage suffers the under voltage glitch.

3. The glitch detector of claim 2, wherein the charge sharing component is a P-type transistor controlled by the supply voltage.

4. The glitch detector of claim 2, wherein before the supply voltage suffers the under voltage glitch, the first signal has a first logical value, the second signal has a second logical value different from the first logical value, and the charge sharing component is disabled; and when the supply voltage suffers the under voltage glitch, the charge sharing component is enabled to make the first node be electrically connected to the second node; and after the under voltage glitch disappears, the first signal has the second logical value, the second signal has the first logical value.

5. The glitch detector of claim 4, wherein the warning flag generator determines that the supply voltage of the glitch detector suffers the under voltage glitch if the first signal has the second logical value or the second signal has the first logical value.

6. The glitch detector of claim 1, further comprising:
a bleeding path, configured to selectively provide a current path between the second node and a reference voltage.

7. The glitch detector of claim 6, wherein the bleeding path does not provide the current path between the second node and the reference voltage when the second signal has a normal voltage level; and the bleeding path provides the current path between the second node and the reference voltage when supply voltage suffers an over voltage glitch and the voltage level of the second signal is greater than a predetermined voltage.

8. The glitch detector of claim 6, wherein the bleeding path comprises a P-type transistor to selectively connect the second node to the reference voltage.

9. The glitch detector of claim 6, wherein the first inverter and the second inverter are powered by the supply voltage, and before the supply voltage suffers the over voltage glitch, the first signal has a first logical value, the second signal has a second logical value different from the first logical value, and the bleeding path is disabled; and when the supply voltage suffers the over voltage glitch, the bleeding path is enabled to provide the current path between the second node and the reference voltage; and after the over voltage glitch is steady, the first signal has the second logical value, the second signal has the first logical value.

10. The glitch detector of claim 9, wherein the warning flag generator determines that the supply voltage of the glitch detector suffers the under voltage glitch if the first signal has the second logical value or the second signal has the first logical value.

11. A glitch detector, comprising:
a first inverter, configured to receive a first signal at a first node to generate a second signal to a second node;
a second inverter, configured to receive the second signal at the second node to generate the first signal to the first node;
a bleeding path, configured to selectively provide a current path between the second node and a reference voltage; and
a warning flag generator, coupled to the first node or the second node, configured to determine whether a supply voltage of the glitch detector suffers an under voltage glitch according to a voltage level of the first signal or a voltage level of the second signal, to determine whether to output a warning flag;
wherein the bleeding path does not provide the current path between the second node and the reference voltage when the second signal has a normal voltage level; and the bleeding path provides the current path between the second node and the reference voltage when supply voltage suffers an over voltage glitch and the voltage level of the second signal is greater than a predetermined voltage.

12. A glitch detector, comprising:
a first inverter, configured to receive a first signal at a first node to generate a second signal to a second node;
a second inverter, configured to receive the second signal at the second node to generate the first signal to the first node;
a bleeding path, configured to selectively provide a current path between the second node and a reference voltage; and
a warning flag generator, coupled to the first node or the second node, configured to determine whether a supply voltage of the glitch detector suffers an under voltage glitch according to a voltage level of the first signal or a voltage level of the second signal, to determine whether to output a warning flag;
wherein the bleeding path comprises a P-type transistor to selectively connect the second node to the reference voltage.

13. A glitch detector, comprising:
a first inverter, configured to receive a first signal at a first node to generate a second signal to a second node;
a second inverter, configured to receive the second signal at the second node to generate the first signal to the first node;
a bleeding path, configured to selectively provide a current path between the second node and a reference voltage; and
a warning flag generator, coupled to the first node or the second node, configured to determine whether a supply voltage of the glitch detector suffers an under voltage glitch according to a voltage level of the first signal or a voltage level of the second signal, to determine whether to output a warning flag;
wherein the first inverter and the second inverter are powered by the supply voltage, and before the supply voltage suffers the over voltage glitch, the first signal has a first logical value, the second signal has a second logical value different from the first logical value, and the bleeding path is disabled; and when the supply voltage suffers the over voltage glitch, the bleeding path is enabled to provide the current path between the second node and the reference voltage; and after the over voltage glitch is steady, the first signal has the second logical value, the second signal has the first logical value.

14. The glitch detector of claim 13, wherein the warning flag generator determines that the supply voltage of the glitch detector suffers the under voltage glitch if the first signal has the second logical value or the second signal has the first logical value.

\* \* \* \* \*